United States Patent [19]

Nakayama et al.

[11] 3,849,251

[45] Nov. 19, 1974

[54] PROCESS FOR PRODUCING L-TRYPTOPHAN

[75] Inventors: Kiyoshi Nakayama, Sagamihara; Hiroshi Hagino, Tokyo, both of Japan

[73] Assignee: Kyowa Hakko Kogyo Co., Ltd., Tokyo, Japan

[22] Filed: May 23, 1973

[21] Appl. No.: 363,039

[30] Foreign Application Priority Data

Nov. 11, 1972  Japan.............................. 47-114236

[52] U.S. Cl..................... 195/29, 195/28 R, 195/30
[51] Int. Cl........................................... C12d 13/06
[58] Field of Search...................... 195/28 R, 29, 30

[56] References Cited
UNITED STATES PATENTS

| | | | |
|---|---|---|---|
| 3,594,279 | 7/1971 | Nakayama et al.................... | 195/28 |
| 3,700,558 | 10/1972 | Thiemann et al...................... | 195/29 |
| 3,700,559 | 10/1972 | Shiio et al............................. | 195/29 |
| 3,801,457 | 4/1974 | Arima et al........................... | 195/29 |

*Primary Examiner*—A. Louis Monacell
*Assistant Examiner*—Robert J. Warden
*Attorney, Agent, or Firm*—Fitzpatrick, Cella, Harper & Scinto

[57]  ABSTRACT

L-tryptophan is produced by the fermentation of mutant strains of *Corynebacterium glutamicum* which require phenylalanine or tyrosine for growth and which are resistant to the inhibitory action of analogues of tryptophan and analogues of phenylalanine or tyrosine. The L-tryptophan is accumulated in the culture medium and is recovered therefrom.

4 Claims, No Drawings

PROCESS FOR PRODUCING L-TRYPTOPHAN

BACKGROUND OF THE INVENTION

The present invention relates to a process for the production of L-tryptophan by fermentation.

L-tryptophan is an amino acid which is essential for the nutrition of numerous animals. It has found commercial application as a feed additive and the like.

Heretofore, L-tryptophan has been produced by processes such as the process of U.S. Pat. No. 2,999,051 (Japanese Patent Publication No. 4632/64; French Patent No. 1,437,998; U.S. Pat. Nos. 3,293,141; 3,385,762; German Offenlegungsschrift No. 2,037,763 [1972]) wherein an L-tryptophan producing microorganism is cultured in a nutrient medium containing indole or anthranilic acid. However, in such process an expensive precursor, i.e., indole or anthranilic acid is indispensable, and therefore the process disadvantageously requires a high material cost. Further, since the precursors have an inhibitory effect on the growth of the microorganisms, large amounts thereof cannot be added to the culture medium thereby significantly reducing the amount of end-product accumulation.

Other known processes include the fermentation of a histidine requiring mutant microorganism (U.S. Pat. No. 3,594,279); a mutant microorganism which is resistant to 5-methyltryptophan (U.S. Pat. No. 3,700,599); and a mutant of *Brevibacterium flavum* No. 2247 i.e. *Br. flavum* 12–555 having a phenylalanine requirement, a tyrosine requirement and 5-methyltryptophan resistance (Nihon Nogei Kagakukai Annual Meeting for 1971, Abstract of Lectures, p. 153). The aforementioned U.S. Pat. No. 3,700,559 also states that the L-tryptophan production of microorganisms which are resistant to 5-methyl-DL-tryptophan can be increased by inducing a phenylalanine and/or tyrosine requirement to the microorganism or by inducing a resistance to compounds analogous to phenylalanine or tyrosine. However, aside from the working examples of the patent, which are limited to microorganisms having a resistance to 5-methyl-DL-tryptophan and a requirement for phenylalnine or tyrosine for growth, there is no disclosure of specific mutants nor of procedures for obtaining mutants which have such resistance to compounds analogous to phenylalanine or tyrosine. Moreover, the yields of L-tryptophan by the mutants of the above publications is about 500 mg/l when the fermentation is carried out in flasks. Even when the fermentation is carried out on a large scale under optimum conditions, the yield is only about 1.9 g/l (Nihon Nogei Kagakukai Annual Meeting for 1971, Abstract of Lectures p. 153). Such yields are so low that it is substantially impossible to utilize the processes on an industrial scale. Accordingly, a more improved process for the industrial production of L-tryptophan is in demand. To this end, the present inventors have discovered the herein described improved process for the production of L-tryptophan on an industrially feasible level.

SUMMARY OF THE INVENTION

The present invention provides a process for the production of L-tryptophan by the fermentation of certain mutant strains of *Corynebacterium glutamicum*. More specifically, according to the present invention mutant strains of *Corynebacterium glutamicum* which require phenylalanine and tyrosine for growth and which are resistant to at least one analogue of tryptophan and at least one phenylalanine or tyrosine analogue are cultured in a nutrient medium to produce heretofore unknown increased amounts of extra-cellular L-tryptophan.

*Corynebacterium glutamicum* is a species of microorganisms belonging to the genus Corynebacterium which is generally characterized by straight to slightly curved rods with irregularly stained segments, sometimes granules. Frequently show club-shaped swellings. Snapping division produces angular and palisade (picket-fence) arrangements of cells. Nonmotile with exceptions among the plant pathogens. Gram-positive, but sometimes young cells and sometimes old cells lose the stain easily. Granules invariably Gram-positive. Generally quite aerobic, but microaerophilic or even anaerobic species occur. Catalase-positive. May or may not liquefy gelatin. May or may not produce nitrites from nitrates. May or may not ferment sugars, but seldom, if ever, produce a high acidity. Many species oxidize glucose completely to $CO_2$ and $H_2O$ without producing visible gas. *Corynebacterium glutamicum* is a synonym for *Micrococcus glutamicus* disclosed in U.S. Pat. No. 3,003,925.

The microorganisms of the present invention are mutants (analog-resistant mutants) of L-tryptophan-producing strains of *Corynebacterium glutamicum*. The strains have a phenylalanine and tyrosine-requirement (including the so called "leaky" type mutants) and are capable of growing as their parent strains in a minimum medium [consisting of 1 percent glucose, 0.1 percent $(NH_4)H_2PO_4$, 0.02% KCl, 0.02% $MgSO_4·7H_2O$, 30 μg/l biotin, 10 mg/l of vitamin $B_1$ hydrochloride, 1 ml/l of a solution of trace metal salts (an aqueous solution containing 88 mg of $Na_2B_4O_7·10H_2O$, 37 mg of $(NH_4)_6·Mo_7O_{24}·4H_2O$, 72 mg of $MnCl_2·4H_2O$, 970 mg of $FeCl_3·6H_2O$, 8.8 mg of $ZnSO_4·7H_2O$ and 20 mg of $CuSO_4·5H_2O$ per 1 liter) and 2% agar] admixed with phenylalanine and tyrosine.

The mutants are also capable of growing in said medium containing at least one tryptophan analogue such as 4-methyltryptophan, 5-methyltryptophan, 6-methyltryptophan, 7-azatryptophan, 5-fluorotryptophan, 6-fluorotryptophan, tryptophan hydroxamate, α-methyltryptophan and indolacrylic acid together with at least one phenylalanine analogue or tyrosine analogue such as 2-fluorophenylalanine, 3-fluorophenylalanine, 4-fluorophenylalanine, 2-methylphenylalanine, 3-methylphenylalanine, 4-methylphenylalanine, 2-hydroxyphenylalanine, 3-hydroxyphenylalanine, 2-aminophenylalanine, 3-aminophenylalanine, 4-aminophenylalanine, 2-nitrophenylalanine, 4-nitrophenylalanine, β-2-thienylalanine, β-3-thienylalanine, 2-indolalanine, 1-naphthalenealanine, 2-naphthalenealanine, 2-pyridinealanine, 2-thiazolalanine, 3-thiazolalanine, phenylalanine hydroxamate, 3-aminotyrosine, 3-fluorotyrosine, 3-hydroxytyrosine, 3-nitrotyrosine, 5-hydroxy-2-pyridinealanine, tyrosine hydroxamate etc. Of course, mutants having other properties such as nutritional requirements other than the above mentioned requirements, resistances to chemicals, etc., may also be employed in the present invention.

In connection with the aforementioned resistance to analogous of tyrosine or phenylalanine, it is to be noted that certain of these analogues are sometimes similar in structure. For example, 4-fluorophenylalanine may be considered as a tyrosine analogue as well as a phenylalanine analogue. Accordingly, it should be understood that the required resistance may be to an analogue of both tyrosine and phenylalanine.

In order to obtain mutant microorganisms according to the present invention, standard procedures for inducing mutation may be followed such as irradiation with ultraviolet ray, X-ray, $Co_{60}$ γ-ray, etc. or treatment with mutation inducing chemicals or the like.

In the present invention strains of Corynebacterium glutamicum are preferably mutated stepwise through various mutation inducing treatments to obtain mutants which exhibit a requirement for tyrosine and phenylalanine as well as a resistance to at least one tryptophan analogue and at least one analogue of phenylalanine or tyrosine. Of course, strains having a combined resistance to a plurality of analogues are useful for the invention.

Microorganisms suitable for the present invention are selected after each mutation inducing treatment by a simple screening procedure as will be more fully described hereinafter. Thus, mutants having the desired characteristics can be obtained.

The mutants of bacteria of Corynebacterium glutamicum having the tyrosine and phenylalanine requirement and the analog resistance obtained through such screening method are then cultured in a liquid medium containing a carbon source, a nitrogen source, inorganic materials and trace amounts of other nutrients essential for the mutants. The mutants having a high ability to produce L-tryptophan are then selected and utilized for the production of L-tryptophan.

As to the fermentation medium employed in the present process for culturing the mutant strains, any synthetic or natural medium can be employed, so long as it contains a proper carbon source, a nitrogen source, inorganic materials, and trace amounts of nutrients necessary for the specific mutant.

Any carbon source and nitrogen source can be used in the medium, so long as they can be utilized by the microorganism. As a carbon source, for example, carbohydrates such as glucose, fructose, sucrose, maltose, mannose, etc.; sugar alcohol such as sorbitol, mannitol; glycerol; starch; starch hydrolyzate liquor; molasses; etc. may be used. Further, various organic acids such as pyrubic acid, lactic acid, acetic acid, fumaric acid, gluconic acid, etc. and lower alcohols such as ethanol, etc. may also be used.

As a nitrogen source, the following substances are appropriate: ammonia; various inorganic and organic ammonium salts such as ammonium chloride, ammonium sulfate, ammonium carbonate, ammonium acetate, etc.; urea and other nitrogen-containing materials; and nitrogenous organic materials such as peptone, NZ-amine, meat extract, yeast extract, corn steep liquor, casein hydrolyzate, fish meal or its digested product, chrysalis hydrolyzate, etc.

As inorganic materials, monopotassium dihydrogen phosphate, dipotassium monohydrogen phosphate, magnesium sulfate, sodium chloride, ferrous sulfate, manganese sulfate, calcium carbonate, etc., may be used.

As for the vitamins and amino acids necessary for the growth of the mutants, they must, of course, be present in the medium. However, it is not necessary that they be separately added to the medium so long as they are supplied to the medium together with other medium components as described above. That is, certain natural ingredients may adequately supply the specific growth promoting factors.

Culturing is carried out under aerobic conditions such as by shaking or aeration-agitation. Suitable culturing temperature is usually 20° to 40°C. It is desirable to keep the pH of the medium around neutrality throughout culturing in order to obtain a high yield, but these temperature and pH conditions are not essential for the practice of the present invention. Culturing is usually carried out for 2 to 5 days, whereby a considerable amount of L-tryptophan is accumulated in the medium.

After the completion of culturing, the cells are removed, and L-tryptophan is recovered from the culture broth by any well known method such as by active carbon treatment, ion exchange resin treatment, etc.

DESCRIPTION OF THE INVENTION

According to the present invention, certain mutant strains of Corynebacterium glutamicum are cultured in a nutrient medium to accumulate L-tryptophan in a culture liquor. The L-tryptophan is then isolated from the culture liquor.

In order to obtain the mutant strains which are suitable for carrying out the purposes of the present invention, bateria belonging to the species Corynebacterium glutamicum are artificially mutated into phenylalanine and tyrosine-requiring strains. These mutants are then again mutated by artificial means. The resulting mutants are then cultured on minimum agar medium admixed with at least one tryptophan analogue and at least one analogue of phenylalanine or tyrosine at a concentration not lower than a concentration which would normally inhibit growth of the parent strain. From colonies which have grown on this medium, the desired strains are isolated. For example, the derivation of mutants of the phenylalanine and tyrosine-requiring bacterium, Corynebacterium glutamicum KY 9456, ATCC 21854, is shown below.

The strain (KY 9456, ATCC 21854) undergoes growth-inhibition by tryptophan analogues and phenylalanine analogues and tyrosine analogues when cultured in the minimum agar medium admixed with phenylalanine and tyrosine at concentrations as shown in Table 1.

Table 1

| Analogues | Minimum concentration to inhibit growth (μg/ml) |
|---|---|
| DL-4-methyltryptophan | 500 |
| DL-5-methyltryptophan | 500 |
| DL-5-fluorotryptophan | 500 |
| DL-6-fluorotryptophan | 3000 |
| L-tryptophan hydroxamate | 500 |
| DL-4-fluorophenylalanine | 25 |
| DL-3-fluorophenylalanine | 50 |
| DL-2-fluorophenylalanine | 50 |
| DL-β-2-thienylalanine | 600 |
| DL-phenylalanine hydroxamate | 400 |
| L-3-aminotyrosine | 4000 |
| DL-tyrosine hydroxamate | 600 |
| DL-4-aminophenylalanine | 3000 |

The values in Table 1 show the minimum growth inhibitory concentrations of the above-cited analogues. They are determined as follows. Corynebacterium glutamicum KY 9456, ATCC 21854 is cultured overnight on a bouillon agar slant. The thus obtained cells are suspended in an isotonic sodium chloride solution, and a portion of the resulting suspension containing $10^6$ to $10^7$ cells is uniformly spread over a minimum agar plate medium supplemented with one of the above-cited analogs in a Petri dish (85 mm in diameter), and cultured at 30°C for 3 days. The degree of inhibition is judged by observing the growth on the medium.

In view of the minimum inhibitory concentration determination of the parent strain, the analogue-resistant strains are screened by scattering the cells of a further mutated strain of *Corynebacterium glutamicum* KY 9456, ATCC 21854 on a minimum agar medium supplemented with a tryptophan analogue and a phenylalanine analogue or a tyrosine analogue at a concentration above the growth inhibitory concentration, for example, 500 μg/ml or more of DL-methyltryptophan, or 500 μg/ml or more of DL-5-methyltryptophan, or 500 μg/ml or more of DL-5-fluorotryptophan, or 3 mg/ml or more of DL-6-fluorotryptopha, or 500 μg/ml or more of L-tryptophan hydroxamate, or 25 μg/ml or more of DL-4-fluorophenylalanine, or 50 μg/ml or more of DL-3-fluorophenylalanine, or 50 μg/ml or more of DL-2-fluorophenylalanine, or 600 μg/ml or more of DL-β-2-thienylalanine, or 400 μg/ml or more of DL-phenylalanine hydroxamate, or 4 mg/ml or more of L-3-aminotyrosine, or 600 μg/ml or more of DL-tyrosine hydroxamate or 3 mg/ml or more of DL-4-aminophenylalanine, etc. After a suitable incubation period, cells are isolated from colonies which have been able to form on the medium. These cells are then suitably cultured to develop microbial populations for industrial purposes.

As a medium for screening the analogue-resistant mutant, usually a solid agar medium containing the analogues, a carbon source, a nitrogen source, inorganic salts, tyrosine, phenylalanine, biotin, vitamin $B_1$ and trace amounts of other nutrients necessary for growth of the parent bacterium, is employed. As for trace nutrients, natural materials which normally contain the nutrients may be employed.

Specific preferred mutant strains of *Corynebacterium glutamicum* obtained by means of the aforementioned screening process have been deposited with the American Type Culture Collection, Rockville, Maryland, and are freely available to the public. These strains have been accorded accession numbers ATCC 21842 to ATCC 21851.

The mutant bacteria of *Corynebacterium glutamicum* of the present invention can produce L-tryptophan in much higher yields as compared with other L-tryptophan producing bacteria of *Corynebacterium glutamicum* employed in the known processes. Specifically, a comparison of the mutant strains of the present invention with the strain of Japanese Patent Publication No. 14395/63 (tyrosine and phenylalanine-requiring strain of *Corynebacterium glutamicum*) and the strain of U.S. Pat. No. 3,594,279 (histidine-requiring strain of *Corynebacterium glutamicum*) reveals, as shown in the following Example 1, that the bacterium of the present invention produce L-tryptophan in a yield about 15 to about 20 times higher than that of the controls. U.S. Pat. No. 3,700,559 discloses that the L-tryptophan yield by *Corynebacterium acetoglutamicum* AJ-3293 (having a phenylalanine requirement, a tyrosine requirement and 5-methyltryptophan resistance) is 0.186 mg/ml, and L-tryptophan yield by *Micrococcus glutamicus* AJ-3295 (having 5-methyltryptophan resistance) is 0.0235 mg/ml. Nihon Nogei Kagakukai Annual Meeting for 1971, Abstract of Lectures (p. 153) discloses that the L-tryptophan yield by *Brevibacterium flavum* 12 – 555 (having a phenylalanine requirement, tyrosine requirement and 5-methyltryptophan resistance) is 1.9 g/l when the fermentation is carried out on a large scale under optimum conditions. On the contrary, the bacteria of *Corynebacterium glutamicum* of the present invention having the phenylalanine and tyrosine requirement and a resistance to at least one tryptophan analogue and at least one member selected from the group consisting of tyrosine analogues and phenylalanine analogues can produce L-tryptophan in yields unexpectedly higher than that of the bacteria of the prior art. That is, the present invention can provide a very excellent industrial process for producing L-tryptophan.

Practice of certain specific embodiments of the present invention is illustrated by the following represntative examples.

Example 1

In this example, a L-tryptophan-producing mutant of *Corynebacterium glutamicum* which has a tyrosine and phenylalanine requirement and a resistance to 5-methyltryptophan, 6-fluorotryptophan and 4-fluorophenylalanine, that is, *Corynebacterium glutamicum* Trp-1, ATCC 21842 is used. The mutant is cultured in a seed medium containing 2 percent glucose, 1 percent peptone, 1 percent yeast extract and 0.3 percent NaCl at 30°C for 24 hours. One ml of the resulting seed culture is inoculated into 10 ml of a fermentation medium having the following composition in a 250 ml Erlenmeyer flask:

| | |
|---|---|
| glucose | 10% |
| $KH_2PO_4$ | 0.05% |
| $K_2HPO_4$ | 0.05% |
| $MgSO_4 \cdot 7H_2O$ | 0.025% |
| $(NH_4)_2SO_4$ | 2% |
| NZ-amine | 0.5% |
| biotin | 30 μg/l |
| $CaCO_3$ | 2% |
| [pH :7.2] | |

Culturing is carried out at 30°C for 4 days with shaking, whereby L-tryptophan is produced in a yield of 3.6 mg/ml.

Two liters of the culture broth resulting from the fermentation is subjected to centrifugation to remove the microbial cells and $CaCO_3$; and the resulting supernatant is passed through a bed of a strongly acidic cation exchange resin, Diaion SK–104 ($H^+$ form) (manufactured by Mitsubishi Kasei Kogyo K.K., Japan) to adsorb the L-tryptophan. After water washing, the resin is subjected to elution with 0.5N aqueous ammonia, and then the resulting eluate is concentrated to obtain crude crystals of L-tryptophan. The crude crystals are dissolved in a small amount of hot 50 percent aqueous ethanol. The resulting solution is decolorized with active carbon and cooled, whereby 3.5 g of L-tryptophan is recrystallized.

When the parent strain of said mutant, that is, *Corynebacterium glutamicum* KY 9456, ATCC 21854 having a tryosine and phenylalanine requirement and *Corynebacterium glutamicum* KY 9104, ATCC 21334 having a histidine requirement (disclosed in U.S. Pat. No. 3,594,279) are cultured under the same conditions, the yields of L-tryptophan are 0.2 mg/ml, and 0.5 mg/ml, respectively.

Example 2

In this example, L-tryptophan-producing mutants belonging to *Corynebacterium glutamicum* which have the properties shown in the following Table 2 are used. These strains are respectively cultured in the seed medium described in Example 1 for 24 hours. One m*l*. of each of the thus prepared seed cultures is transferred into 250 m*l* Erlenmeyer flasks containing 10 m*l* of a fermentation medium comprising:

| | |
|---|---|
| cane blackstrap molasses (in terms of glucose) | 10% |
| $KH_2PO_4$ | 0.05% |
| $K_2HPO_4$ | 0.05% |
| $MgSO_4 \cdot 7H_2O$ | 0.025% |
| $(NH_4)_2SO_4$ | 2% |
| corn steep liquor | 1% |
| $CaCO_3$ | 2% |
| [pH : 7.2] | |

Culturing is carried out at 30°C for 4 days with shaking. The results are shown in Table 2.

Table 2

| Stain *C. glutamicum* | Property (*) | Amount of L-tryptophan formed (mg/ml) |
|---|---|---|
| Trp-2 (ATCC 21843) | phe⁻, tyr⁻, 5MT$^r$, 6FT$^r$, 4AP$^r$ | 3.4 |
| Trp-3 (ATCC 21844) | phe⁻, tyr⁻, 5MT$^r$, 6FT$^r$, Tyrhx$^r$ | 3.2 |
| Trp-4 (ATCC 21845) | phe⁻, tyr⁻, 4MT$^r$, 6FT$^r$, Phehx$^r$ | 3.3 |
| Trp-5 (ATCC 21846) | phe⁻, tyr⁻, 4MT$^r$, 6FT$^r$, 3AT$^r$ | 3.7 |
| Trp-6 (ATCC 21847) | phe⁻, tyr⁻, 5MT$^r$, 6FT$^r$, 4AP$^r$, 4FP$^r$ | 7.0 |
| Trp-7 (ATCC 21848) | phe⁻, tyr⁻, Trphx$^r$, 6FT$^r$, 4AP$^r$, 3FP$^r$ | 6.2 |
| Trp-8 (ATCC 21849) | phe⁻, tyr⁻, 6FT$^r$, 4AP$^r$, 2FR$^r$ | 6.0 |
| Trp-9 (ATCC 21850) (FERM-P No. 1674) | phe⁻, tyr⁻, 5MT$^r$ 6FT$^r$, 4AP$^r$, 4FP$^r$, Tyrhx$^r$ | 10.0 |
| Trp-10 (ATCC 21851) (FERM-P No. 1675) | phe⁻, tyr⁻, 4MT$^r$ 6FT$^r$, 4AP$^r$, 4FP$^r$, Tyrhx $^r$, Phehx$^r$ | 11.5 |

*
phe⁻ : requiring phenylalanine
tyr⁻ : requiring tyrosine
5MT$^r$ : resistance to 5-methyltryptophan
6FT$^r$ : resistance to 6-fluorotryptophan
4MT$^r$ : resistance to 4-methyltryptophan
Trphx$^r$ : resistance to trptophan hydroxamate
4AP$^r$ : resistance to 4-aminophenylalanine
Tyrhx$^r$ : resistance to tyrosine hydroxamate
Phehx$^r$ : resistance to phenylalanine hydroxamate
3AT$^r$ : resistance to 3-aminotyrosine
4FP$^r$ : resistance to 4-fluorophenylalanine
3FP$^r$ : resistance to 3-fluorophenylalanine
2FP$^r$ : resistance to 2-fluorophenylalanine

Example 3

In this example, *Corynebacterium glutamicum* Trp-10, ATCC 21851 is cultured for 24 hours in a seed culture medium containing 7 percent cane sugar blackstrap molasses (in terms of glucose), 0.3 percent corn steep liquor, 0.1 percent $KH_2PO_4$, 0.1 percent $K_2HPO_4$, 0.05 percent $MgSO_4 \cdot 7H_2O$ and 0.9 percent soybean cake decomposate (obtained by decomposing soybean cake with 6N sulfuric acid and neutralizing the decomposate with aqueous ammonia; in terms of soybean cake). Three hundred m*l* of the seed culture in then inoculated into 3 liters of a fermentation medium having the following composition in a 5 liter jar fermenter.

| | |
|---|---|
| Cane sugar blackstrap molasses (in terms of glucose) | 15% |
| Corn steep liquor | 0.1% |
| $KH_2PO_4$ | 0.1% |
| $K_2HPO_4$ | 0.1% |
| $MgSO_4 \cdot 7H_2O$ | 0.05% |
| Soybeam cake decomposate liquor (in terms of soybean cake) | 0.9% |
| [pH: 7.2] | |

Culturing is carried out at 30°C at an aeration rate of 3 l/min with stirring at 600 r.p.m. for 72 hours. As a result, 16.8 mg/ml of L-tryptophan is produced.

What is claimed is:

1. A process for producing L-tryptophan by fermentation which comprises culturing a mutant strain of *Corynebacterium glutamicum* which requires phenylalanine and tyrosine for growtn and which is resistant to at least one analogue of tryptophan and at least one of the group consisting of phenylalanine analogues and tyrosine analogues, in an aqueous nutrient medium containing sources of carbon, nitrogen, inorganic nutrients and required growth factors; accumulating L-tryptophan in the resulting culture liquor and recovering said L-tryptophan therefrom.

2. A process according to claim 1 wherein said mutant strain is selected from the group consisting of *Corynebacterium glutamicum* ATCC 21842, ATCC 21843, ATCC 21844, ATCC 21845, ATCC 21846, ATCC 21847, ATCC 21848, ATCC 21849, ATCC 21850 and ATCC 21851.

3. A process according to claim 1, wherein culturing is carried out at a temperature of about 20° to 40°C and at a pH around neutrality.

4. A process according to claim 1 wherein said L-tryptophan is recovered by means of an ion exchange resin treatment.

* * * * *